United States Patent
Senkal et al.

(10) Patent No.: US 11,526,018 B2
(45) Date of Patent: Dec. 13, 2022

(54) PHASED ARRAY OF ULTRASOUND TRANSDUCERS FOR DEPTH SENSING

(71) Applicant: Meta Platforms Technologies, LLC, Menlo Park, CA (US)

(72) Inventors: Doruk Senkal, Kirkland, WA (US); Sedat Pala, Berkeley, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 110 days.

(21) Appl. No.: 17/196,130

(22) Filed: Mar. 9, 2021

(65) Prior Publication Data

US 2022/0291513 A1 Sep. 15, 2022

(51) Int. Cl.
*G02B 27/01* (2006.01)
*G02B 27/00* (2006.01)
*G01S 15/89* (2006.01)
*G06F 3/01* (2006.01)

(52) U.S. Cl.
CPC ...... *G02B 27/0176* (2013.01); *G01S 15/8915* (2013.01); *G02B 27/0093* (2013.01); *G06F 3/013* (2013.01); *G02B 2027/0178* (2013.01)

(58) Field of Classification Search
CPC ............ G02B 27/0176; G02B 27/0093; G02B 2027/0178; G01S 15/8915; G06F 3/013
See application file for complete search history.

(56) References Cited

U.S. PATENT DOCUMENTS

| | | | |
|---|---|---|---|
| 10,908,279 B2* | 2/2021 | Scally | G01S 13/66 |
| 11,387,804 B2* | 7/2022 | Robichaud | H03H 3/0072 |
| 2006/0093170 A1* | 5/2006 | Zhe | H04R 31/003 381/396 |
| 2012/0021806 A1* | 1/2012 | Maltz | H04W 4/20 455/566 |
| 2013/0257709 A1* | 10/2013 | Raffle | G06F 3/013 345/156 |
| 2014/0265720 A1* | 9/2014 | El-Gamal | B06B 1/0292 310/300 |
| 2017/0202541 A1* | 7/2017 | Ralston | G01S 15/8977 |
| 2017/0261610 A1* | 9/2017 | Scally | G01S 15/50 |

* cited by examiner

Primary Examiner — Mihir K Rayan
(74) Attorney, Agent, or Firm — Fenwick & West LLP (57) ABSTRACT

A depth sensing system is configured to track one or both eyes of a user. The depth sensing system includes a transducer chip comprising a phased array of ultrasound transducers that transmit a signal at an eye of the user and detect a reflected signal from the eye. A controller estimates an orientation of the eye based on the reflected signals received by the phased array. The depth sensing system may be part of a headset that includes a display element configured to display content to a user wearing the headset.

19 Claims, 7 Drawing Sheets

PHASED ARRAY OF ULTRASOUND TRANSDUCERS FOR DEPTH SENSING

FIELD OF THE INVENTION

The present disclosure generally relates to eye tracking, and specifically relates to using ultrasound for eye tracking in artificial reality applications.

BACKGROUND

Eye tracking refers to the process of detecting the direction of a user's gaze, which may detect angular orientation of the eye in 3-dimensional (3D) space. Additionally, eye tracking may detect a location of the eye (e.g., the center of the eye), a torsion (i.e., the roll of the eye about the pupillary axis) of the eye, a shape of the eye, a current focal distance of the eye, a dilation of the pupil, or other features of the eye's state. One conventional technique for eye tracking captures video images of a user and identifies an orientation of the user's pupils using a machine vision algorithm. Capturing video images of a user to determine the direction of the user's gaze in a virtual reality headset has additional drawbacks. For example, types of cameras for capturing images from which an orientation of a user's pupil may be determined are typically relatively expensive, large, and have high power consumption. Similarly, such a technique may place constraints on the proximity of the camera to the user's eye, which places constraints on the device used for eye tracking. However, when performing eye tracking in an artificial reality environment, using a detection element that is small and relatively close to the user's eye for eye tracking may be preferred.

SUMMARY

A depth sensing system is configured to scan one or more facial features of a user of a headset. The depth sensing system may be configured to scan one or both eyes of a user, one or both ears of a user, a forehead of a user, some other facial feature of a user, or some combination thereof. The depth sensing system includes a transducer chip comprising a phased array of ultrasound transducers that transmit a signal at the facial feature of the user and detect a reflected signal from the facial feature. In some embodiments, a controller estimates an orientation of the eye based on the reflected signals received by the phased array. The depth sensing system may be part of a headset that includes a display element configured to display content to a user wearing the headset. The depth sensing system may include a phased array of ultrasound transducers for each eye of the user.

The depth sensing system may estimate a direction of a pupillary axis of the eye and estimate a direction of a foveal axis of the eye based on the estimated direction of the pupillary axis and based on an offset between the pupillary axis and the foveal axis. The controller may be configured to estimate the orientation of the eye based in part on a detected position of a feature of the eye. For example, the feature may be the curvature of the cornea, the cornea-sclera interface, iris features beneath the cornea, and/or the vertex of the cornea.

The controller may steer the ultrasonic beams transmitted by the transducer chip to different locations on the eye. The controller generates a scan of the eye by measuring the distance at the different locations on the eye. The controller may adjust the focus of the ultrasonic beams to different depths based on estimated distances to the different locations on the eye.

In some embodiments, a headset comprises a frame and a transducer chip coupled to the frame. The transducer chip comprises a plurality of ultrasound transducers in a phased array configured to transmit ultrasonic beams and receive reflected ultrasonic signals. A controller is configured to estimate an orientation of an eye of a user of the headset based on the reflected ultrasonic signals.

In some embodiments, a transducer chip comprises a substrate and a phased array of ultrasound transducers positioned on the substrate. Each of the ultrasound transducers comprises a Piezoelectric Micromachined Ultrasonic Transducer (PMUT). The phased array is configured to steer ultrasonic beams to different locations of an eye. The phased array is configured to receive reflected ultrasound signals from the ultrasonic beams reflecting off the eye.

In some embodiments, a method comprises transmitting, by a transducer chip comprising a plurality of ultrasound transducers, a plurality of ultrasonic beams toward an eye. The transducer chip receives a reflected signal from the eye. A controller calculates a distance measurement based on the received signals. The controller generates a scan based on the calculated distance measurement. The controller estimates a gaze direction of the eye based on the scan.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An artificial reality headset comprises a depth sensing system configured to scan one or more facial features of a user of the headset. The depth sensing system includes a transducer chip comprising a phased array of ultrasound transducers that transmit a signal at the facial feature of the user and detect a reflected signal from the facial feature. A controller estimates distances and orientations of the facial feature based on the reflected signals. The controller may steer ultrasonic beams transmitted by the transducer chip to different locations on the facial feature. The controller generates a scan of the facial feature by measuring the distance at the different locations on the facial feature. The controller may adjust the focus of the ultrasonic beams to different depths based on estimated distances to the different locations on the facial feature.

The depth sensing system may be configured to scan various facial features. In some embodiments, the depth sensing system is configured to scan one or both eyes of a user and estimate gaze directions of the eyes. In some embodiments, the depth sensing system may be configured to scan one or both ears of a user and determine head related transfer functions (HRTFs) for the user. In some embodiments, the depth sensing system may be configured to scan a forehead of a user and determine whether the user is wearing the headset. In some embodiments, the depth sensing system may be configured to scan the mouth, cheeks, eyes, or some combination thereof, and determine facial expressions of the user.

In contrast to depth sensing systems which utilize one or more cameras, the relatively small size of the depth sensing systems disclosed herein use less power and allow the transducer chip to be located within a frame nearer to, and centered relative to, an eye of the user. Additionally, in contrast to depth sensing systems which use multiple discrete transmitters and receivers, the depth sensing systems disclosed herein may be implemented with a single transducer chip having a phased array of transducers that may steer and focus ultrasonic beams to different locations of a facial feature.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Figure 1A:
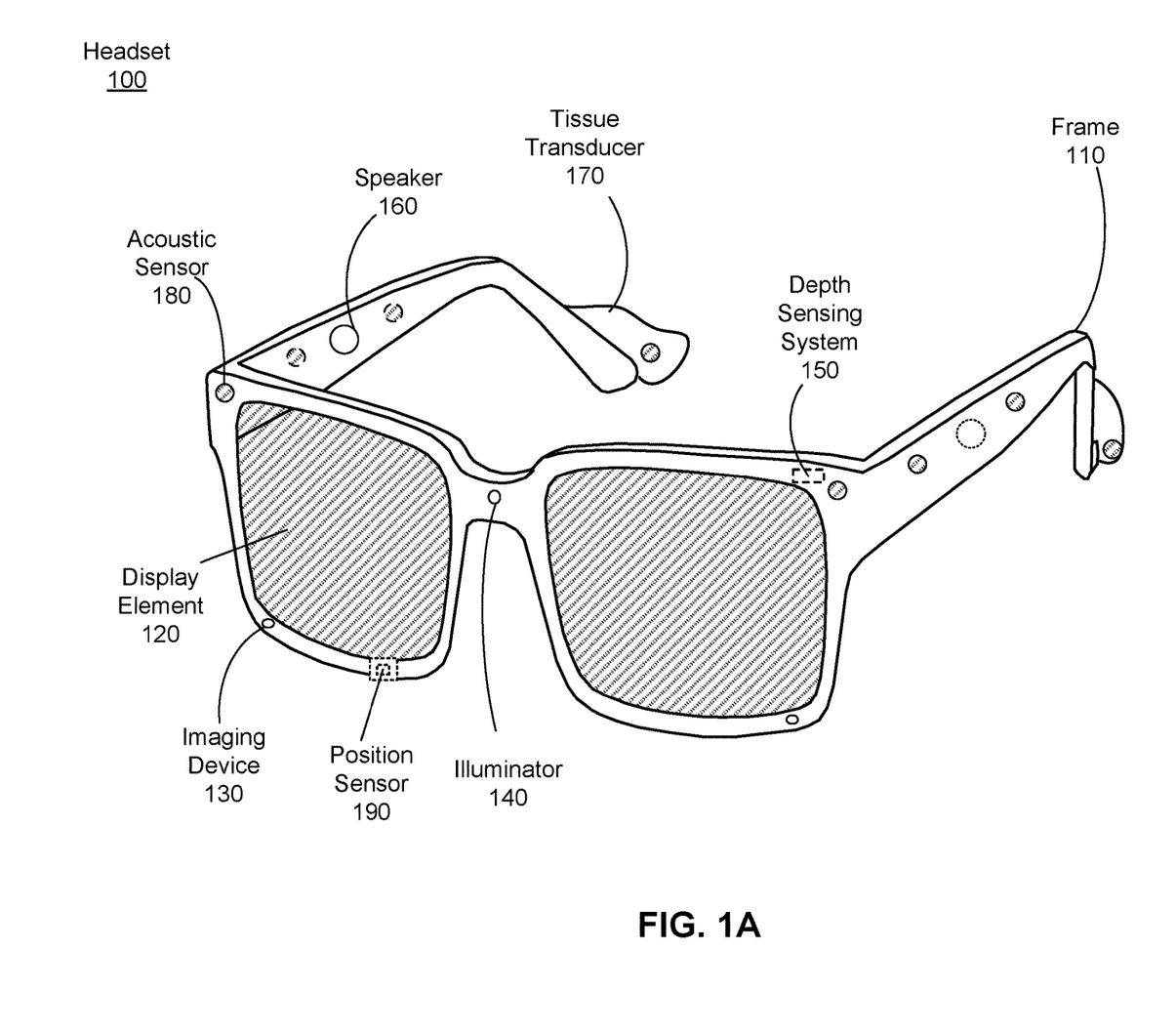
FIG. 1A is a perspective view of a headset implemented as an eyewear device, in accordance with one or more embodiments.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, an outward facing depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The outward facing DCA determines depth information for a portion of a local area surrounding the headset 100. The outward facing DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof. The outward facing DCA may include a depth sensing system that determines eye tracking information. The eye tracking information may comprise information about a position and an orientation of one or both eyes (within their respective eye-boxes).

The headset 100 comprises a depth sensing system 150 configured to scan a facial feature of a user of the headset. The depth sensing system 150 may determine the orientation of the user's eyes. In some embodiments, the depth sensing system 150 may scan one or both ears of a user, a forehead of a user, some other facial feature of a user, or some combination thereof. In some embodiments, scans of an ear shape of the user may be used to determine head related transfer functions (HRTFs) for the user. In some embodiments, scans of a forehead of the user or other facial feature of the user may be used to determine whether the user is wearing the headset.

The depth sensing system 150 includes one or more ultrasound transducers. The depth sensing system estimates an angular orientation of one or both eyes based on ultrasound measurements of one or both eyes by the one or more ultrasound transducers. In some embodiments, the depth sensing system may also include one or more illuminators that illuminate one or both eyes with an illumination pattern (e.g., structured light, glints, etc.) and one or more cameras that capture images of the eyes. The headset 100 may prompt the user to opt in to allow operation of the depth sensing system 150. For example, by opting in the headset 100 may detect and store scans or images of the user's eyes or any eye tracking information of the user.

The depth sensing system 150 may comprise a single transducer chip for each eye. The transducer chip may comprise a plurality of ultrasound transducers arranged in a phased array. The transducer chip may steer and focus ultrasonic beams to different locations on an eye to measure distances and create scans of the eye. The depth sensing system 150 may use TOF measurements of transmitted and received ultrasonic beams to calculate distances to different portions of the eye and estimate an orientation of the eye. The depth sensing system 150 is further described below in conjunction with FIGS. 2-6.

The audio system provides audio content. The audio system includes a transducer array, a sensor array, and an audio controller. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller processes information from the sensor array that describes sounds detected by the sensor array. The audio controller may comprise a processor and a computer-readable storage medium. The audio controller may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the outward facing DCA may also function as the PCA. The images captured by the PCA and the depth information determined by the outward facing DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 6.

Figure 1B:
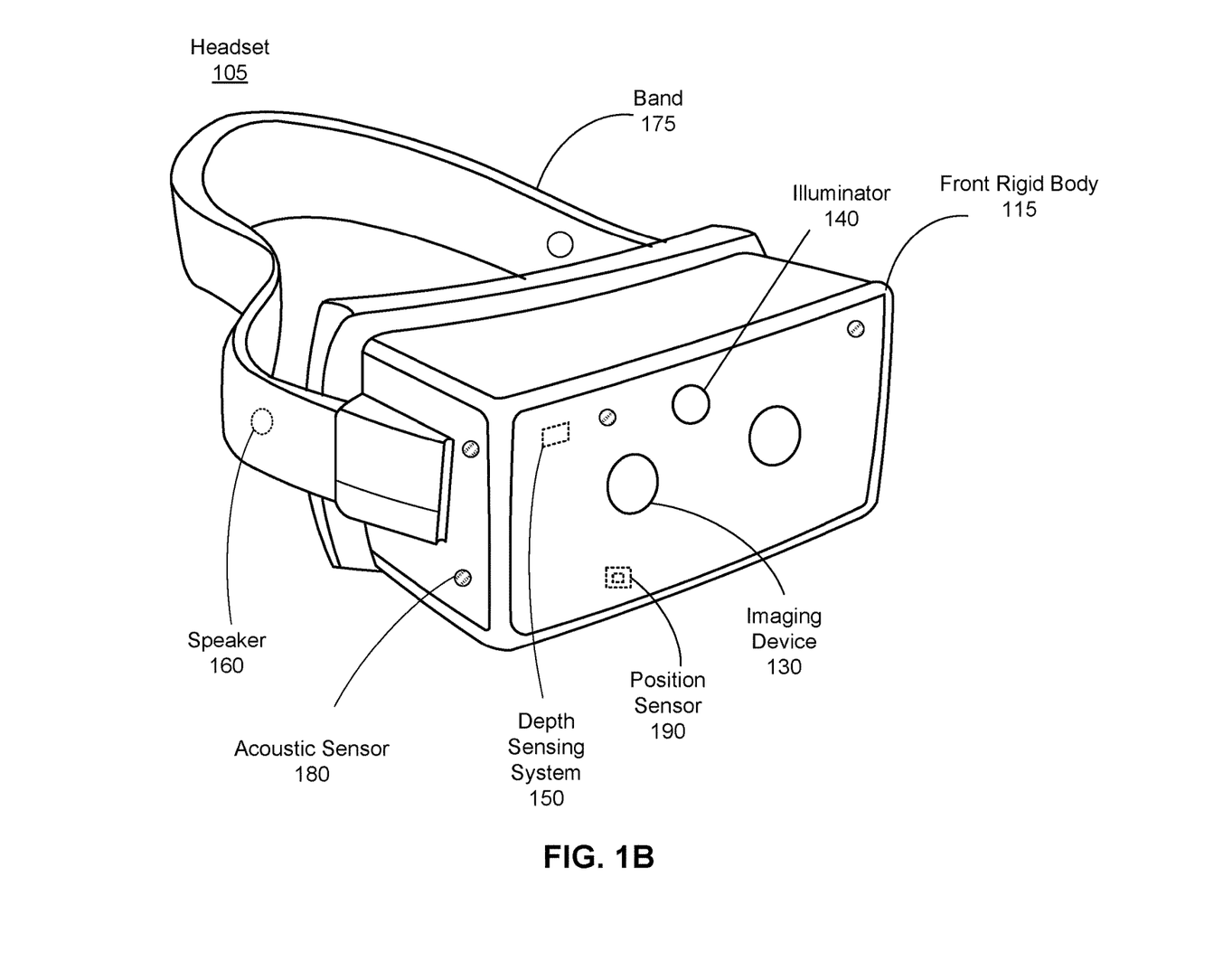
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a depth sensing system 150, an outward facing DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
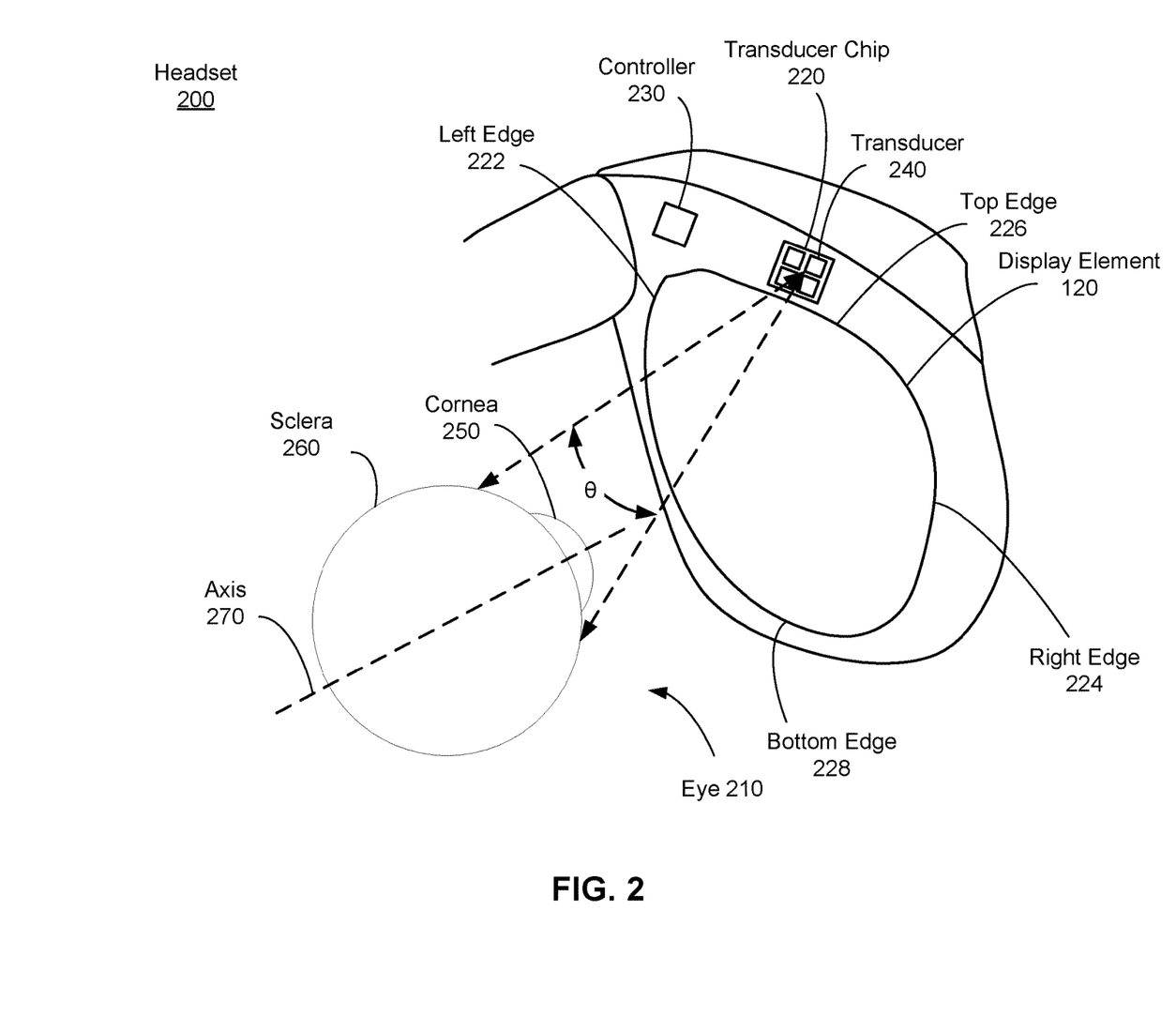
FIG. 2 is a headset having a depth sensing system, in accordance with one or more embodiments.

FIG. 2 illustrates a depth sensing system in a headset 200. The headset 100 of FIG. 1 may be an embodiment of the headset 200 of FIG. 2. The depth sensing system 150 of FIG. 1A and FIG. 1B may be an embodiment of the depth sensing system of headset 200. Similar components described with reference to the depth sensing system of FIG. 2 may be coupled to the front rigid body 115 of FIG. 1B. The depth sensing system is configured to track the position of the user's eye 210 by repeatedly scanning the eye 210. The depth sensing system comprises a transducer chip 220 and a controller 230. A transducer chip 220 for the left eye is illustrated. Similarly, a second transducer chip may monitor the user's right eye.

The transducer chip 220 both transmits and receives ultrasound signals. Transmitting and receiving ultrasound signals allows the transducer chip 220 to scan the eye 210. Herein, $\{x_1(t), \ldots, x_N(t)\}$ denotes the set of N signals transmitted by the transducer chip 220, and $\{y_1(t), \ldots, y_R(t)\}$ denotes the set of R signals received by the transducer chip 220. In the embodiment depicted in FIG. 2, the transducer chip 220 transmits and receives two signals (i.e., N=R=2). However, the transducer chip 220 may transmit and receive any suitable number of signals to scan the eye 210.

The transducer chip 220 may be coupled to, or embedded within, the frame 110. In some embodiments, the transducer chip 220 may be centered between a left edge 222 and a right edge 224 of the display element 120. In some embodiments, the transducer chip 220 may be centered between a top edge 226 and a bottom edge 228 of the display element 120. As used herein, "centered" refers to a location within 20% of a midpoint between two reference locations. A center of the display element 120 may be estimated to be a center of the eyebox of the eye 210. Thus, the transducer chip 220 may be located at a center of the vertical or horizontal dimension of the eyebox of the eye 210. For uses other than eye tracking, the transducer chip 220 may be located in different locations on the frame 110. For example, for scanning an ear of the user, the transducer chip 220 may be located in the temple of the frame 110 near the user's ear.

The transducer chip 220 may be located off-axis from the center of the eye 210 in at least one dimension. The transducer chip 220 may utilize beam steering to allow the transducer chip 220 to scan objects that are slightly off-axis. The transducer chip 220 may utilize constructive and destructive interference of the output from multiple transducers 240 to steer the beams toward the eye 210. Increasing the number of transducers 240 or optimizing the distance between the transducers 240 may increase the beam steering angle. In some embodiments, the transducer chip 220 may comprise a rectangular grid of transducers 240 which increases the field-of-view in one dimension. In some embodiments, the transducer chip 220 may be angled toward the eye 210, such that a vector normal to the surface of the transducer chip 220 points toward the eye 210. In some embodiments, there may be multiple transducer chips 220 located in different locations on the frame 110, which may increase the total field of view of the transducer chips 220.

The transducer chip 220 comprises a plurality of ultrasound transducers 240. The ultrasound transducers 240 may comprise Piezoelectric Micromachined Ultrasonic Transducers (PMUT), which are MEMS-based piezoelectric ultrasonic transducers. Each ultrasound transducer 240 is a small size (e.g., 100-1000 microns), which allows many ultrasound transducers 240 to be located on a single transducer chip 220. The ultrasound transducers 240 are configured to emit ultrasound waves at approximately 100-1000 kHz. In some embodiments, the ultrasound transducers 240 transmit signals having a single frequency or within a narrowband spectrum of ultrasound radiation. Alternatively, the ultrasound transducers 240 transmit multiple narrow band frequencies. The geometry of the ultrasound transducers 240 is further described herein with reference to FIG. 3 and FIG. 4.

The ultrasound transducers 240 may be configured in a phased array. The transducer chip 220 may accordingly form ultrasonic beams and steer and focus the beams to scan different locations on the eye 310. The transducer chip 320 may steer the beam across a field of view θ, which may be approximately 40-50°, or between 30-80° in both the vertical and horizontal directions. The transducer chip 220 may additionally focus the ultrasonic beams to different depths. The time delay between multiple transducers 240 may be changed to focus and/or steer the ultrasonic beams. The time delay may be implemented during the transmitting of the beams. In some embodiments, similar techniques may be employed during the receiving of the reflected beams to locate the z-y-z position of the point the beams are reflected from. For example, a single transducer 240 may be used to transmit an ultrasonic wave, and multiple transducers 240 may be used to receive the reflected signal and measure the delay in arrival between multiple transducers 240. Based on a measured distance to a point on the eye 210, the transducer chip 220 may subsequently focus emitted ultrasonic beams to that measured distance for future measurements at the same location. In some embodiments, during one scan in which measurements are taken at multiple locations, the transducer chip 220 may focus the ultrasonic beams at different distances based on an estimated or previously measured distance to each location. The width of the ultrasonic beam may be a function of the number of ultrasound transducers 240 in the phased array. Increasing the number of ultrasound transducers 240 may decrease the width of the ultrasonic beam, which may allow the ultrasonic beam to be directed to more discrete locations.

The illustrated eye 210 includes a cornea 250 and a sclera 260. The eye further comprises a retina, a fovea, and an optic disk. The cornea 250 is a curved surface covering an iris and a pupil of the eye 210. The cornea 250 generally protrudes from the curved surface of the sclera 260. The sclera is an opaque outer portion of the eye including collagen and elastic fiber. In some embodiments, the transducer chip 220 transmit signals toward both the cornea 250 and the sclera 260 of the eye 210. Because the cornea 250 projects outward from the approximately ellipsoidal sclera 260, the depth sensing system 160 may estimate an angular orientation of the eye 210 by detecting a position of the cornea 250. In some embodiments, propagation characteristics of a signal or of different signals may be used to determine the position of the cornea 250. For example, if the cornea 250 and the sclera 260 have different indices of refraction for ultrasound of frequency $f_1$, differing amplitudes of sound reflected by the cornea 250 and the sclera 260 may be used to distinguish between the cornea 250 and the sclera 260. Similarly, if the cornea 250 or the sclera 260 have different indices of refraction at a first frequency $f_1$ and at a second frequency $f_2$, a variation in reflected energy between the two frequencies may be used to distinguish between signals reflected by the cornea 250 and by the sclera 260.

The retina is an inner layer at the back of the eye 210 that is sensitive to light and includes the fovea, which is a depression in the retina positioned along the axis 270 of the eye 210 and including closely packed cones providing sharp central vision to the user. The axis 270 of the eye 210 is an orientation of the eye 210 that changes as the eye 210 moves. In FIG. 2, the eye 210 is depicted in its centered position (i.e., looking straight ahead), so the axis 270 of the eye 210 in FIG. 2 is the center axis of the eye.

The depth sensing system is configured to scan the eye 210 by taking distance measurements at multiple points of the eye 210. The depth sensing system may measure distances to multiple points on the cornea 250 and multiple points on the sclera 260. Based on the multiple measurements, the depth sensing system may model the surface of the eye 210. In some embodiments, the depth sensing system may measure distances to multiple points below the surface of the eye 210, such as to the retina or other features within the eye. In some embodiments, the headset 200 may instruct the user to look at a certain point, such as a light displayed on the display element, to establish a baseline position of the eye 210.

The depth sensing system estimates an angular orientation of the user's eye. The angular orientation of the eye corresponds to a direction of the user's gaze within the headset 100 and is defined herein as the direction of the foveal axis, which is the axis between a fovea (an indentation on the retina of the eye) of the eye and a center of the eye's pupil. In general, when a user's eyes are fixed on a point, the foveal axes of the user's eyes intersect that point. The eye also includes a pupillary axis, which is the axis passing through the center of the pupil, which is perpendicular to the corneal surface. Generally, the pupillary axis does not directly align with the foveal axis. Both the pupillary and foveal axes intersect at the center of the pupil, but the orientation of the foveal axis is offset from the pupillary axis by approximately −1° to 8° laterally and ±4° vertically. Because the foveal axis is defined relative to the fovea, which is located in the back of the eye, detection of the foveal axis may be difficult or impossible when using certain methods of eye tracking.

Accordingly, in some embodiments, the depth sensing system detects an orientation of the pupillary axis and estimates the foveal axis based on the detected pupillary axis. Alternately, the depth sensing system estimates the foveal axis by directly detecting a location of the fovea or of other features of the eye's retina.

In general, movement of an eye corresponds to an angular rotation of the eye, as well as a translation of the eye, a change in the torsion of the eye, or a change in shape of the eye. The depth sensing system may also detect translation of the eye, which is a change in the position of the eye relative to the eye socket. In some embodiments, translation of the eye is not directly detected, but is approximated based on a mapping from a detected angular orientation. Translation of the eye corresponding to a change in the eye's position relative to one or more components of the depth sensing system may also be detected. Translation of the eye relative to one or more components of the depth sensing system may occur when a position of the headset 100 on a user's head shifts. The depth sensing system may also detect torsion of the eye, which is rotation of the eye about the pupillary axis. The depth sensing system may use detected torsion of the eye to estimate orientation of the foveal axis based on a detected pupillary axis. The depth sensing system may also track a change in the shape of the eye, which may be approximated as a skew, a scaling linear transform, or a twisting distortion (e.g., due to torsional deformation). Based on a combination of the angular orientation of the pupillary axis, the translation of the eye, the torsion of the eye, and the current shape of the depth sensing system may estimate the foveal axis.

In some embodiments, the depth sensing system may be used to detect translation and rotation of the headset 200 with respect to the user's eyes and head. In some embodiments, the depth sensing system may measure interpupillary distance, which refers to the distance between the user's pupils. In some embodiments, the depth sensing system may detect deformations in the headset 200 due to external stress or acceleration by using the sclera 260 or other body features as a reference point.

To estimate orientation of the user's eye, the depth sensing system includes a plurality of transducers 240 on the transducer chip 220 that produce ultrasound signals, which are reflected by the eye. The reflected signals are detected by the transducers 240. The reflected signal indicates shape, movement, and orientation of the eye, and processing the reflected signal enables determination of the eye's orientation. Generating one or more signals transmitted toward the eye and detecting one or more resultant reflected signals is denoted herein as "scanning" the eye. The depth sensing system processes the reflected signals to generate a set of "scans," which may be used to estimate the orientation of the user's eye. Unlike conventional depth sensing systems, an ultrasound depth sensing system may track the eye when the eye is closed (e.g., when the user is blinking).

The depth sensing system may include transducer chip 220 for the left eye of the user and an additional transducer chip for the right eye of the user. In some embodiments, the transducers are PMUT transducers that emit ultrasound waves. As orientation of both eyes of the user may be determined, the depth sensing system is able to determine where the user is looking. Based on the orientation of the eye, the headset 100 may: determine an inter-pupillary distance (IPD) of the user, introduce depth cues (e.g., blur image outside of the user's main line of sight), perform another function based at least in part on the orientation of at least one of the user's eyes, or some combination thereof.

In some embodiments, the controller 230 generates or trains a model, M, prior to eye tracking. For example, the controller 230 trains the model, M during a calibration sequence performed prior to eye tracking. The controller 230 comprises instructions that, when executed by one or more processors, a dedicated hardware unit, or some combination thereof cause the one or more processors or dedicated hardware unit to perform the functions further described below. In some embodiments, the controller 230 repeatedly scans the eye with the transducer chip 220 during the calibration sequence. For example, the user is instructed to look at a certain virtual object or visual indicator displayed on the display element of the headset 200. A portion of the eye is scanned while the user is looking at the visual indicator, allowing the depth sensing system to capture sample scans of the eye at known orientations of the eye. These sample scans may be combined into the model, M. After the controller 230 generates the model, M, the depth sensing system 160 may subsequently track the user's eye. In some embodiments, the controller 230 updates the model, M, during eye tracking.

Interaction between the ultrasonic signals and the portion of the eye create echoes according to the geometry of the surface of the portion eye or according to the internal geometry and acoustic properties of the portion of the eye. The echoes propagate back to the ultrasound transducers, which convert the echoes into electrical signals. The reflected signals are used to determine a shape of a surface of the eye and/or an internal geometry of the eye.

In some embodiments, the controller 230 controls a frequency or a waveform of signals transmitted by the transducer chip 220. Additionally, the controller 230 may include one or more phase shifters used in conjunction with the transducer chip 220 to implement a phased array. The phase shifters may implement fixed phase shifts (e.g., with passive phase shifters) or phase shifts controlled by the controller 230 (e.g., for beam steering). To implement beam steering in a phased array, the controller 230 may include one or more digital to analog converters and a digital signal processing system in the control subsystem to generate signals of the appropriate phase shift. The controller 230 may also include one or more voltage controlled oscillators (VCOs) controlled by the control subsystem of the controller 230. The controller 230 outputs a set of N electrical signals, $\{x_1(t), \ldots, x_N(t)\}$ that drive N transducers 240 of the transducer chip 220 to generate ultrasound radiation.

The controller 230 receives electrical signals from the transducer chip 220. In various embodiments, the controller 230 receives R electrical signals, $\{y_1(t), \ldots, y_R(t)\}$, generated by the transducer chip 220 in response to received signals. Signals received by the transducer chip 220 are a combination of reflections from the transmitted signals and random noise. The controller 230 processes the received electrical signals, $\{y_1(t), \ldots, y_R(t)\}$. For example, the controller 230 processes the received electrical signals using high pass filters, low pass filters, band pass filters, phase shifters, other analog signal processing component, or some combination thereof. The controller 230 may detect characteristics of the processed signal or convert the processed electrical signals to digital signals using analog-to-digital converters, digital or analog down converters, power detectors, amplitude detectors, phase detectors, frequency detectors, correlators, or some combination thereof.

Based on the detected characteristics or digital signals, the controller 230 creates a set of K scans, $\{S_1, \ldots, S_K\}$. Each scan, $S_i$ for $i \in \{1, \ldots, K\}$, may be based on multiple received signals (e.g., the full set $\{y_1(t), \ldots, y_R(0)\}$ or based on a portion of each of the received signals, $\{y_1(t), \ldots, y_R(t)\}$, corresponding to a range of time. In embodiments in which the transducer chip 220 transmits pulses of ultrasonic sound, a time period in which multiple pulses are transmitted may be used to generate a single scan. In some embodiments, different scans correspond to cross-sections of different portions of the eye. Cross-sectional planes for every scan may all be parallel, and planes may be separated by a fixed distance (e.g., 2.4/K cm, where K is the number of scans). In some embodiments, the controller 230 produces 1-dimensional (1D) scans.

The set $\{S_1, \ldots, S_K\}$ of scans may be used to produce a single estimate of the orientation of the eye. As described above, the set $\{S_1, \ldots, S_K\}$ of scans may be generated based on the values of $\{y_1(t), \ldots, y_R(t)\}$ for a certain range of time (e.g., $T_1 < t < T_2$), which is also referred to herein as a "frame." In some embodiments, all frames have a fixed duration and occur with a constant frequency. In some embodiments, frames do not overlap in time, so a set of scans from a frame does not include an additional set of scans from another frame. Hence, sets of scans from different frames are generated from different, non-overlapping time periods. In other embodiments, frames overlap in time, where the scans of a frame are based on signals or scans from one or more previous frames, but not from frames corresponding to later times. For purposes of illustration, scanning the eye and estimating an eye's orientation is discussed herein with reference to a single set of scans, $\{S_1, \ldots, S_K\}$, for a single frame. However, the description herein regarding the estimation of an eye's orientation from a single frame may be applied to estimating the eye's orientation over time based on additional frames.

In some embodiments the controller 230 outputs a single 3D scan, which may be based on a set of 2D scans (e.g., cross-sections). The single 3D scan may be a 2D surface embedded in a 3D space (e.g., the surface of the eye or the surface of the retina) or a 3D volume of a portion of the eye. The 3D volume of the portion of the eye may indicate the index of refraction, the rate of acoustic attenuation (e.g., in dB/cm), the rate of scattering, the rate of change of the index of refraction (e.g., a magnitude of the gradient of a function of the index of refraction), or some combination thereof. Thus, the 3D volume may be a function mapping three spatial dimensions to an estimate of an index of refraction at various points or to an estimate of another suitable quantity.

In some embodiments, a specific feature of the eye is tracked by the controller 230. For example, the controller 230 tracks a surface feature of the eye, such as: the cornea, the sclera, an interface of the cornea and the sclera, a vertex of the cornea, a blood vessel or some other deviation on the sclera, any other suitable external feature, and some combination thereof. In other examples the controller 230 tracks one or more internal features of the eye, such as: the retina, the lens, the fovea, the optical disk, one or more blood vessels, any other suitable internal features, and some combination thereof. A location of the tracked feature may be determined from the scans of the eye, which may be used to estimate the orientation of the eye. To track a feature, an expected position of the tracked feature may be determined based on a position of the tracked feature in a frame corresponding to a time earlier than a current time or a detected velocity of the tracked feature. An area or a volume of the eye including the expected position may be selectively scanned to track the feature. However, the controller 230 may use any suitable method to determine the values of yaw and pitch, respectively, $\alpha$ and $\beta$ for which the model, M, and the set, $\{S_1, \ldots, S_K\}$, of scans most closely match.

In some embodiments, the controller 230 is configured to measure the distance to a facial feature other than the eye. For example, the controller 230 may be configured to measure the distance between the transducer chip 220 and the bridge of the nose or forehead of the user, and the measured distance may be utilized to determine whether the user is wearing the headset 200. In some embodiments, the controller 230 is configured to scan an ear of the user to determine the ear shape and determine HRTFs for the user. In some embodiments, the controller 230 may be configured to track facial features such as the mouth or cheeks of the user to determine facial expressions. The transducer chip 220 may direct ultrasound beams to the facial feature and detect reflected ultrasound waves from the facial feature to measure the distance. The measured distance may be utilized, for example, to determine a position of the headset 200 on the user's face. The headset 200 may use the measured distance to adjust the display, audio, or other aspects of the headset. In some embodiments, the headset 200 may utilize the measured distance to the facial feature to determine whether the user is wearing the headset 200. For example, in response to the measured distance being between 1-7 cm, the headset 200 may determine that the user is wearing the headset 200, and the headset may be in an active mode. In contrast, in response to the measured distance being greater than 7 cm, or in response to the distance being unmeasurable (e.g., if there is not a reflected signal detected), the headset 200 may determine that the headset 200 is not being worn by a user, and various systems of the headset 200 may be deactivated to conserve battery power. In some embodiments, while the headset 200 is in a sleep mode, the controller 230 may instruct the transducer chip 220 to emit ultrasound pulses at regular intervals, such as once every 10 seconds, to determine if a facial feature is detected, indicating that the user as placed the headset 200 on the user's head and that the headset 200 should activate any deactivated systems.

Figure 3:
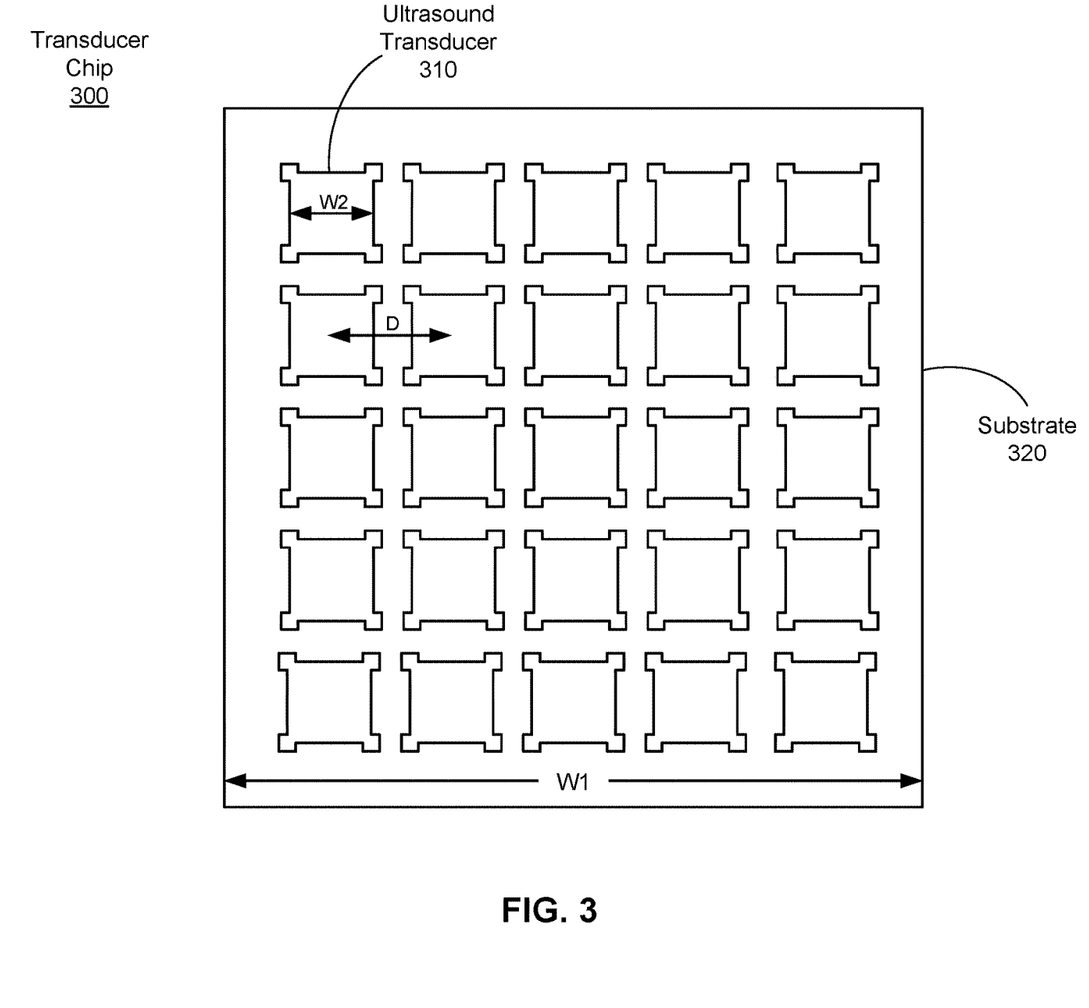
FIG. 3 is a plan view of a transducer chip, in accordance with one or more embodiments.

FIG. 3 illustrates a plan view of a transducer chip 300, in accordance with an embodiment. The transducer chip 300 may be an embodiment of the transducer chip 220 of FIG. 2. The transducer chip 300 comprises an array of ultrasound transducers 310 located on a substrate 320. Each ultrasound transducer 310 may be coupled to a respective bond pad on the substrate 320. Each ultrasound transducer 310 may be individually controllable, such that the array of ultrasound transducers 310 may function as a phased array. As illustrated, the transducer chip 300 comprises twenty-five ultrasound transducers 310 arranged in a grid of five rows and five columns of ultrasound transducers 310. However, in other embodiments, different numbers and arrangements of ultrasound transducers 310 may be utilized.

The substrate 320 may comprise an approximately square shape. The substrate 320 may comprise a width W1 of approximately 2 mm, or between 1-10 mm. Each ultrasound transducer 310 may comprise a width W2 of approximately 100-1000 microns. A distance D between the centers of adjacent ultrasound transducers 310 may be approximately 200-800 microns. In some embodiments, the distance D between the centers of adjacent ultrasound transducers 310 may be aperiodic. In some embodiments, the distance D between the centers of adjacent ultrasound transducers 310 may be different in the horizontal direction (left to right as illustrated) versus the vertical direction (top to bottom as illustrated). The distance D may affect the maximum beam steering angle and the magnitude and angle of side lobes, which may produce secondary beams at various angles in addition to the primary beam. In some embodiments, multiple transducer chips 300 may be fabricated on a single die, and the die may be cut to separate the individual transducer chips 300.

Figure 4:
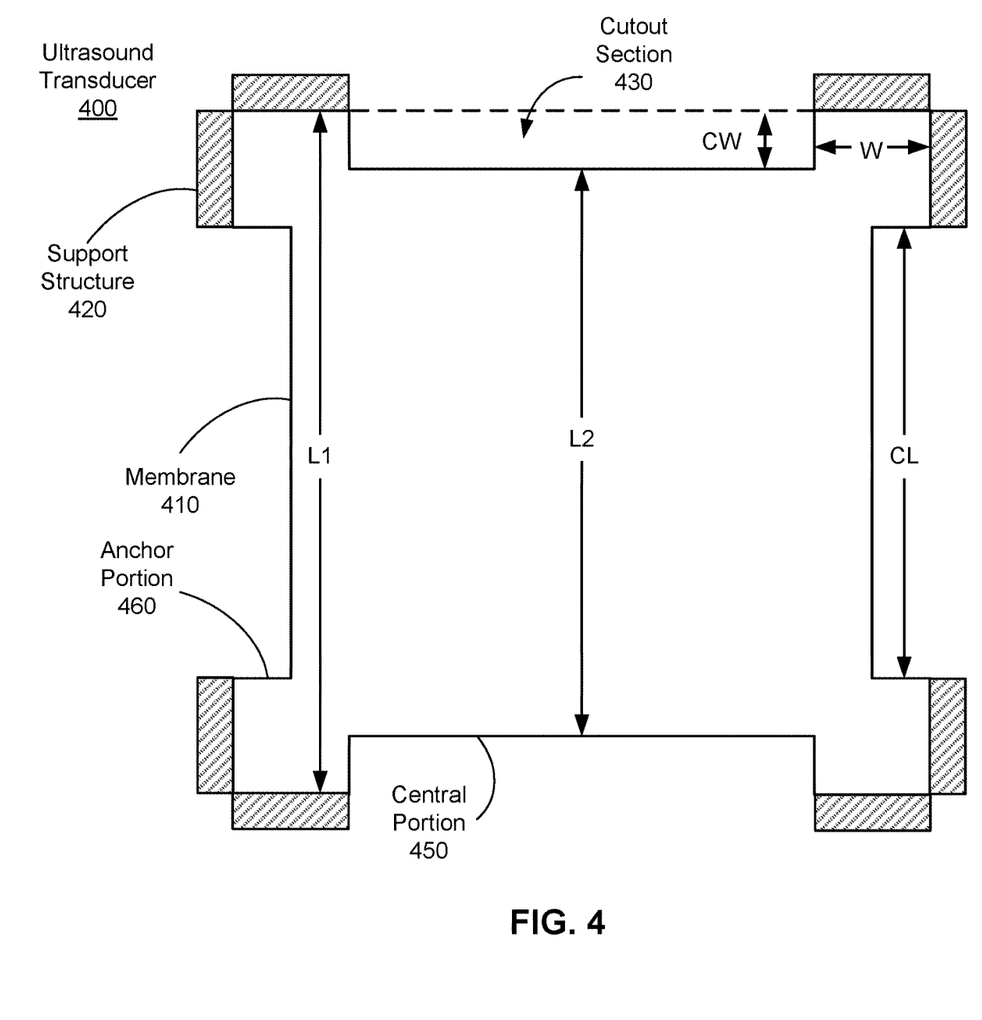
FIG. 4 is a plan view of an ultrasound transducer, in accordance with one or more embodiments.

FIG. 4 illustrates a plan view of an ultrasound transducer 400, in accordance with an embodiment. The ultrasound transducer 400 may be an embodiment of the transducers 240 of FIG. 2. The ultrasound transducer 400 is configured to emit and detect ultrasound waves at a frequency suitable to measure distances between a headset and a facial feature of a user of the headset, such as the eye of the user. The distance between the headset and the facial feature of the user is typically between 1-7 cm. In order to measure distances in this range, ultrasound waves of approximately 100-1000 kHz may be utilized.

The ultrasound transducer 400 may comprise a PMUT transducer. The ultrasound transducer 400 comprises a membrane 410 configured to vibrate to emit or detect ultrasound waves. The membrane 410 is configured to vibrate in a direction normal to the surface of the membrane 410 (i.e., in and out of the page). The ultrasound transducer 400 may comprise a cavity between the membrane 410 and the substrate on which the ultrasound transducer is mounted, into which the membrane 410 may vibrate. The ultrasound transducer 400 further comprises a plurality of support structures 420 at each corner of the membrane 410 configured to anchor the membrane 410 to a substrate. The membrane 410 may comprise a generally square shape having a length L1 of approximately 200-600 microns.

For small ultrasound transducers, such as the ultrasound transducer 400, the frequency of emitted ultrasound waves tends to be relatively high. The signal of higher frequencies may attenuate over short distances, which may make high frequencies (e.g., over 10,000 kHz), unsuitable for measuring distances in the desired range of 1-7 cm. The ultrasound transducer 400 comprises a cutout section 430 (also referred to as a gap) on one or more sides of the membrane 410. Although removing the cutout section 430 may decrease the pressure of ultrasound waves emitted by the membrane 410, the cutout sections 430 may decrease the frequency of emitted ultrasound waves, and result in ultrasound waves being emitted in the desired frequency range of between 100-1,000 kHz. As illustrated, the cutout sections 430 comprises a cutout width CW of approximately 1-10 microns, and a cutout length CL of approximately 200-400 microns. In some embodiments, the cutout width CW may be between 1-50 microns. In some embodiments, the cutout length CL may be between 100-500 microns. In some embodiments, the frequency of the ultrasound transducer 400 may be tuned by adjusting the cutout width CW and the cutout length CL. In the illustrated embodiment, the cutout sections 430 result in the membrane 410 having a central portion 450 having a length L2 of approximately 200-400 microns, and an anchor portion 460 located at each corner of the membrane 410 and having a width W of approximately 10-50 microns. The anchor portions 460 are coupled to the support structures 420 and configured to couple the membrane 410 to a substrate. The size of the anchor portions 460 affects the size of the cutout sections 430, which in turn affects the acoustic properties, such as how much acoustic pressure is lost and the transducer frequency. The anchor portions 460 may comprise non-square shapes in some embodiments, such as circular shapes, which may improve the shock and drop robustness by distributing the stress over the circular shape. The length L2 of the central portion 450 is less than the length L1 of the membrane 410 measured across the anchor portions 460. In the illustrated embodiment, the cutout sections 430 are rectangularly shaped. However, in other embodiments, the cutout sections 430 may comprise arcs, triangles, or any other suitable shape. The cutout sections 430 reduce the resonance frequency of the membrane 410 without increasing the size of the membrane 410. The cutout sections 430 may reduce the stiffness of the membrane 410, which in turn reduces the resonance frequency of the membrane 410.

Figure 5:
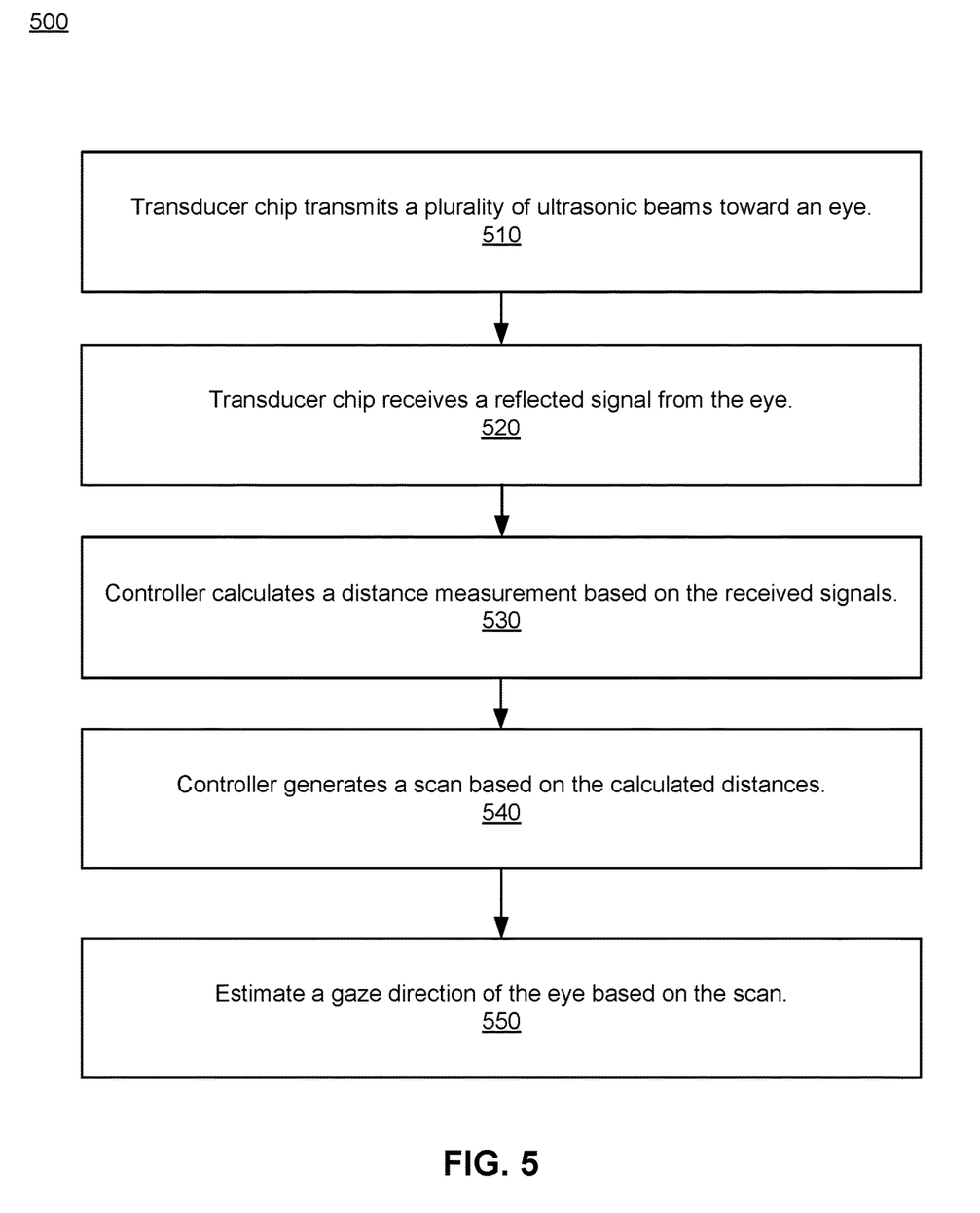
FIG. 5 is a flowchart illustrating a process for eye tracking, in accordance with one or more embodiments.

FIG. 5 is a flowchart of a method for eye tracking 500, in accordance with one or more embodiments. The process shown in FIG. 5 may be performed by components of a depth sensing system (e.g., depth sensing system 150). Other entities may perform some or all of the steps in FIG. 5 in other embodiments. Embodiments may include different and/or additional steps, or perform the steps in different orders.

A headset comprises a depth sensing system having a transducer chip. The transducer chip transmits 510 a plurality of ultrasonic beams toward an eye. The transducer chip may comprise a phased array of ultrasound transducers. Each transducer of the phased array may comprise a PMUT transducer. The transducer chip may transmit an ultrasonic beam to each of a plurality of locations on the eye. One or more of the locations may be on a sclera of the eye, and one or more of the locations may be on a cornea of the eye. The phased array of ultrasound transducers may be utilized to steer the ultrasonic beam to the different locations.

The transducer chip receives 520 a reflected signal from the eye. The reflected signal may comprise an ultrasonic wave which was generated by the transducer chip and reflected by the eye. The transducer chip may receive a reflected signal for each ultrasonic beam which was transmitted by the transducer. The transducer chip converts the received signals into an electronic signal which is measured by a controller.

The controller calculates 530 a distance measurement based on the received signals. The distance measurement represents a distance between the transducer chip and the location to which the ultrasonic beam was directed. In some embodiments, the distance may be calculated using a time of flight calculation. The time of flight calculation may be performed using envelope detection of the received signal, I/Q demodulation, threshold based detection, or some combination thereof. Detecting arrival times between multiple transducers may be used to gain information about x-y position in addition to depth information. The controller may calculate a distance measurement for each location to which an ultrasonic beam was directed.

The controller generates 540 a scan based on the calculated distances. The scan may comprise the distances measured at each location to which an ultrasonic beam was directed. In some embodiments, a training scan may comprise a greater number of calculated distances than a tracking scan. For example, a training scan may comprise 8-20 distance measurements to different locations on the eye in order to generate a model of the eye. The model of the eye may describe locations of the cornea and the sclera. Subsequent tracking scans may comprise 5-10 distance measurements to different locations of the eye in order to determine a subsequent orientation of the eye. Once the general location of the cornea is established by the training scan, the controller may select one or more locations on the cornea and one or more locations on the sclera for subsequent tracking scans. Using fewer locations for the tracking scans may allow the depth sensing system to track the eye at a faster frame rate and using less power in comparison to the training scan.

The controller estimates 550 a gaze direction of the eye based on the scan. The controller may analyze the scan to detect a location of the cornea. Based on the location of the cornea, the controller may estimate a direction of a pupillary axis of the eye and estimate a direction of a foveal axis of the eye based on the estimated direction of the pupillary axis and based on an offset between the pupillary axis and the foveal axis. The gaze direction may be used by the headset for various purposes, such as to display content, to modify the resolution of displayed content outside of the user's primary focus, to calibrate the depth sensing system, to provide audio content based on the gaze direction, or for any other suitable purpose.

Figure 6:
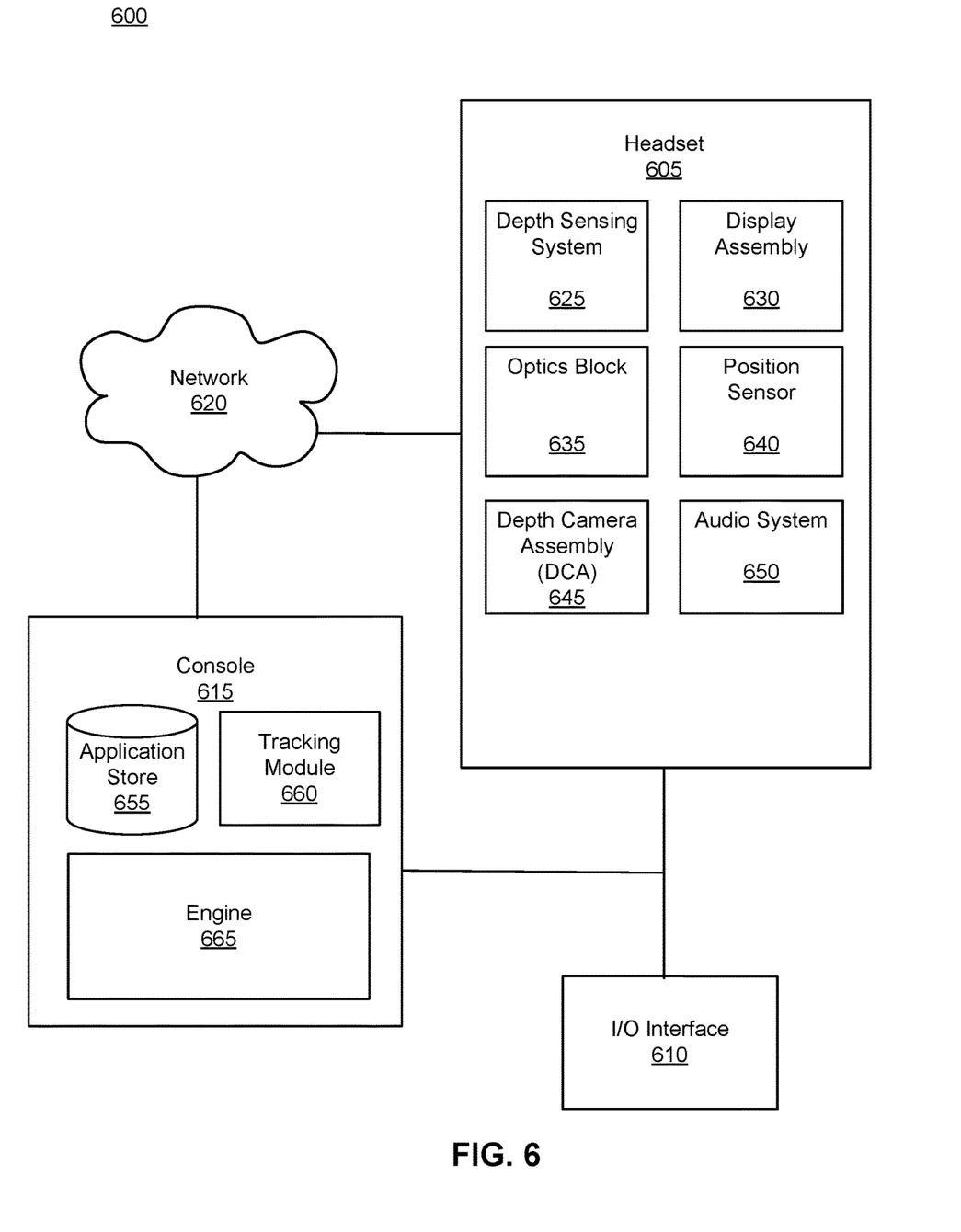
FIG. 6 is a system that includes a headset, in accordance with one or more embodiments.

FIG. 6 is a system 600 that includes a headset 605, in accordance with one or more embodiments. In some embodiments, the headset 605 may be the headset 100 of FIG. 1A or the headset 105 of FIG. 1B. The system 600 may operate in an artificial reality environment (e.g., a virtual reality environment, an augmented reality environment, a mixed reality environment, or some combination thereof). The system 600 shown by FIG. 6 includes the headset 605, an input/output (I/O) interface 610 that is coupled to a console 615, and the network 620. While FIG. 6 shows an example system 600 including one headset 605 and one I/O interface 610, in other embodiments any number of these components may be included in the system 600. For example, there may be multiple headsets each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes the depth sensing system 625, the display assembly 630, an optics block 635, one or more position sensors 640, and the outward facing DCA 645. Some embodiments of headset 605 have different components than those described in conjunction with FIG. 6. Additionally, the functionality provided by various components described in conjunction with FIG. 6 may be differently distributed among the components of the headset 605 in other embodiments, or be captured in separate assemblies remote from the headset 605.

The depth sensing system 625 is configured to scan a facial feature of a user of the headset. The depth sensing system 625 may determine the orientation of the user's eyes. In some embodiments, the depth sensing system 625 may scan one or both ears of a user, a forehead of a user, some other facial feature of a user, or some combination thereof. The depth sensing system 625 includes one or more ultrasound transducers. The depth sensing system estimates an angular orientation of one or both eyes based on ultrasound measurements of one or both eyes by the one or more ultrasound transducers. In some embodiments, the depth sensing system may also include one or more illuminators that illuminate one or both eyes with an illumination pattern (e.g., structured light, glints, etc.) and one or more cameras that capture images of the eyes. The headset 100 may prompt the user to opt in to allow operation of the depth sensing system 150. For example, by opting in the headset 100 may detect and store scans or images of the user's eyes or any eye tracking information of the user.

The depth sensing system 625 may comprise a single transducer chip for each eye. The transducer chip may comprise a plurality of ultrasound transducers arranged in a phased array. The transducer chip may steer and focus ultrasonic beams to different locations on an eye to measure distances and create scans of the eye. The depth sensing system 625 may use TOF measurements of transmitted and received ultrasonic beams to calculate distances to different portions of the eye and estimate an orientation of the eye.

The depth sensing system 625 may provide information describing the orientation of the eye and gaze direction to other components of the headset 605 and to the console 615. For example, the display assembly 630 may modify the display to have an increased resolution in the area of the gaze direction. Similarly, the outward facing DCA 645 may increase the resolution of depth calculations in the area of the gaze direction. The audio system 650 may generate audio content based on the gaze direction.

The display assembly 630 displays content to the user in accordance with data received from the console 615. The display assembly 630 displays the content using one or more display elements (e.g., the display elements 120). A display element may be, e.g., an electronic display. In various embodiments, the display assembly 630 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 640 is an electronic device that generates data indicating a position of the headset 605. The position sensor 640 generates one or more measurement signals in response to motion of the headset 605. The position sensor 190 is an embodiment of the position sensor 640. Examples of a position sensor 640 include: one or more IMUS, one or more accelerometers, one or more gyroscopes, one or more magnetometers, another suitable type of sensor that detects motion, or some combination thereof. The position sensor 640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU integrates the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605.

The outward facing DCA 645 generates depth information for a portion of the local area. The outward facing DCA includes one or more imaging devices and a DCA controller. The outward facing DCA 645 may also include an illuminator. Operation and structure of the outward facing DCA 645 is described above with regard to FIG. 1A.

The audio system 650 provides audio content to a user of the headset 605. The audio system 650 is substantially the same as the audio system 200 describe above. The audio system 650 may comprise one or acoustic sensors, one or more transducers, and an audio controller. The audio system 650 may provide spatialized audio content to the user. In some embodiments, the audio system 650 may request acoustic parameters from a mapping server over the network 620. The acoustic parameters describe one or more acoustic properties (e.g., room impulse response, a reverberation time, a reverberation level, etc.) of the local area. The audio system 650 may provide information describing at least a portion of the local area from e.g., the outward facing DCA 645 and/or location information for the headset 605 from the position sensor 640. The audio system 650 may generate one or more sound filters using one or more of the acoustic parameters received from a mapping server, and use the sound filters to provide audio content to the user.

The I/O interface 610 is a device that allows a user to send action requests and receive responses from the console 615. An action request is a request to perform a particular action. For example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the outward facing DCA 645, the headset 605, and the I/O interface 610. In the example shown in FIG. 6, the console 615 includes an application store 655, a tracking module 660, and an engine 665. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605, or a remote system.

The application store 655 stores one or more applications for execution by the console 615. An application is a group of instructions, that when executed by a processor, generates content for presentation to the user. Content generated by an application may be in response to inputs received from the user via movement of the headset 605 or the I/O interface 610. Examples of applications include: gaming applications, conferencing applications, video playback applications, or other suitable applications.

The tracking module 660 tracks movements of the headset 605 or of the I/O interface 610 using information from the outward facing DCA 645, the one or more position sensors 640, or some combination thereof. For example, the tracking module 660 determines a position of a reference point of the headset 605 in a mapping of a local area based on information from the headset 605. The tracking module 660 may also determine positions of an object or virtual object. Additionally, in some embodiments, the tracking module 660 may use portions of data indicating a position of the headset 605 from the position sensor 640 as well as representations of the local area from the outward facing DCA 645 to predict a future location of the headset 605. The tracking module 660 provides the estimated or predicted future position of the headset 605 or the I/O interface 610 to the engine 665.

The engine 665 executes applications and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left, the engine 665 generates content for the headset 605 that mirrors the user's movement in a virtual local area or in a local area augmenting the local area with additional content. Additionally, the engine 665 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

The network 620 couples the headset 605 and/or the console 615 to external systems. The network 620 may include any combination of local area and/or wide area networks using both wireless and/or wired communication systems. For example, the network 620 may include the Internet, as well as mobile telephone networks. In one embodiment, the network 620 uses standard communications technologies and/or protocols. Hence, the network 620 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 620 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 620 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

One or more components of system 600 may contain a privacy module that stores one or more privacy settings for user data elements. The user data elements describe the user or the headset 605. For example, the user data elements may describe a physical characteristic of the user, an action performed by the user, a location of the user of the headset 605, a location of the headset 605, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 600 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A headset comprising:
    a frame;
    a transducer chip coupled to the frame, the transducer chip comprising a plurality of ultrasound transducers in a phased array configured to transmit ultrasonic beams and receive reflected ultrasonic signals, each ultrasound transducer of the plurality of ultrasound transducers comprising a membrane and an anchor portion located at each corner of the membrane, a width of the anchor portion affecting acoustic properties of the ultrasonic beams; and
    a controller configured to estimate an orientation of an eye of a user of the headset based on the reflected ultrasonic signals.

2. The headset of claim 1, wherein the plurality of ultrasound transducers comprise a plurality of Piezoelectric Micromachined Ultrasonic Transducer (PMUT) transducers or a plurality of Capacitive Micromachined Ultrasonic Transducer (CMUT) transducers.

3. The headset of claim 1, wherein the controller is further configured to steer the ultrasonic beams transmitted by the plurality of ultrasound transducers.

4. The headset of claim 1, wherein the transducer chip is centered relative to a vertical axis or a horizontal axis of a display element of the headset.

5. The headset of claim 1, wherein each of the plurality of ultrasound transducers comprises a cutout section on at least one side of the membrane.

6. The headset of claim 1, wherein the controller is further configured to scan the eye of the user by calculating depth measurements to a plurality of locations of the eye.

7. The headset of claim 1, wherein the controller is further configured to adjust a focus of the transmitted ultrasonic beams and steer the transmitted ultrasonic beams.

8. A transducer chip comprising:
    a substrate; and
    a phased array of ultrasound transducers positioned on the substrate, the phased array configured to:
        steer ultrasonic beams to different locations of an eye, and
        receive reflected ultrasound signals from the ultrasonic beams reflecting off the eye,
    wherein each of the ultrasound transducers comprises:
        a Piezoelectric Micromachined Ultrasonic Transducer (PMUT) transducer,
        a membrane, and
        an anchor portion located at each corner of the membrane, a width of the anchor portion affecting acoustic properties of the ultrasonic beams.

9. The transducer chip of claim 8, wherein each of the ultrasound transducers is individually controllable.

10. The transducer chip of claim 8, wherein a width of each of the ultrasound transducers is between 100-1000 microns.

11. The transducer chip of claim 8, wherein the membrane comprises a cutout section on at least one side of the membrane, and the cutout section reduces a resonance frequency of the membrane.

12. The transducer chip of claim 11, wherein a width of the cutout section is between 1-10 microns.

13. The transducer chip of claim 8, wherein the ultrasound transducers are configured to emit ultrasonic waves at between 100-1000 kHz.

14. A method comprising:
transmitting, by a transducer chip comprising a plurality of ultrasound transducers, a plurality of ultrasonic beams toward an eye, each ultrasound transducer of the plurality of ultrasound transducers comprising a membrane and an anchor portion located at each corner of the membrane, a width of the anchor portion affecting acoustic properties of the plurality of ultrasonic beams;
receiving, by the transducer chip, reflected ultrasonic signals from the eye;
calculating, by a controller, a distance measurement based on the reflected ultrasonic signals;
generating, by the controller, a scan based on the calculated distance measurement; and
estimating, by the controller, a gaze direction of the eye based on the generated scan.

15. The method of claim 14, further comprising:
steering a first ultrasonic beam of the plurality of ultrasonic beams to a first location on the eye; and
steering a second ultrasonic beam of the plurality of ultrasonic beams to a second location on the eye.

16. The method of claim 14, further comprising converting, by the transducer chip, the reflected ultrasonic signals into an electronic signal which is measured by the controller.

17. The method of claim 14, wherein the scan comprises a training scan comprising distance measurements at a first number of locations on the eye, and further comprising generating a tracking scan, the tracking scan comprises distance measurements at a second number of locations on the eye, and the second number is less than the first number.

18. The method of claim 14, wherein estimating the gaze direction comprises:
estimating a direction of a pupillary axis of the eye; and
estimating a direction of a foveal axis of the eye based on the estimated direction of the pupillary axis and an offset between the pupillary axis and the foveal axis.

19. The method of claim 14, wherein each of the plurality of ultrasound transducers comprises a Piezoelectric Micromachined Ultrasonic Transducer (PMUT) transducer.

* * * * *